US012737327B2

(12) United States Patent
Hurrelmann et al.

(10) Patent No.: US 12,737,327 B2
(45) Date of Patent: Sep. 15, 2026

(54) DATABASE SCHEMA FOR EFFICIENT QUERIES AND DATA STORAGE

(71) Applicant: ServiceNow, Inc., Santa Clara, CA (US)

(72) Inventors: Wiebke Hurrelmann, Berlin (DE); Valencio Cardoso, San Diego, CA (US); Srinivas Naik Lavudiya, Hyderabad (IN); Swapnil Gupta, Hyderabad (IN); Allan Sabol, Poway, CA (US); Kartheek Nandiki, Hyderabad (IN); Abishek Ashes Bera, Kolkata (IN); Mei Yeh, Lakeport, CA (US); Somesh Bose, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 19/004,990

(22) Filed: Dec. 30, 2024

(65) Prior Publication Data

US 2026/0187038 A1 Jul. 2, 2026

(51) Int. Cl.
*G06F 16/21* (2019.01)

(52) U.S. Cl.
CPC .................................. *G06F 16/212* (2019.01)

(58) Field of Classification Search
CPC ................. G06F 16/212; G06F 16/284; G06F 2221/2141; G06F 16/288; G06Q 30/0256; G06Q 30/01; G06Q 10/10; G06Q 10/103; G06Q 10/0633; G06Q 10/06; G06Q 10/1053; G06Q 10/06398; G06Q 10/06316; G06Q 10/40; G06Q 10/063112
USPC .................................................. 707/654, 805
See application file for complete search history.

(56) References Cited

U.S. PATENT DOCUMENTS 10,872,539 B1 12/2020 Brueckner
11,263,913 B2 3/2022 Harney
11,508,250 B2 11/2022 Watkins, Jr.
11,948,475 B2 4/2024 Falash
2003/0139953 A1* 7/2003 Guenther ......... G06Q 10/06398 705/7.42
2003/0187723 A1* 10/2003 Hadden ............ G06Q 10/06398 705/7.42
2009/0276231 A1* 11/2009 Bazigos ................... G09B 7/00 705/320
2012/0253872 A1* 10/2012 Peters ............ G06Q 10/063112 705/7.13
2018/0039928 A1* 2/2018 Singh ............. G06Q 10/063112

(Continued)

OTHER PUBLICATIONS

Servicenow, Xanadu Now Platform Capabilities, Sep. 17, 2024.

*Primary Examiner* — Evan Aspinwall
(74) *Attorney, Agent, or Firm* — McDonnell Boehnen Hulbert & Berghoff LLP

(57) ABSTRACT

An embodiment may involve: identifying an entry in a database table representing an individual; determining, based on one or more capabilities database tables, a set of current capabilities of the individual; determining, based on one or more target capability database tables, a set of target capabilities of a target role; identifying, based on the set of current capabilities and the set of target capabilities, a capability gap of the individual; based on the capability gap, identifying steps that the individual can take to satisfy the target capabilities; and generating a graphical user interface component identifying the capability gaps or the steps.

20 Claims, 16 Drawing Sheets

(56) References Cited

U.S. PATENT DOCUMENTS

2018/0075770 A1* 3/2018 Falash .................... G09B 9/24
2022/0406207 A1* 12/2022 Celano .................... G09B 5/02
2024/0135478 A1 4/2024 Luca
2025/0371500 A1* 12/2025 VenkateshaMurthy .................... G06F 16/335

* cited by examiner

600

| | 602 | 604 | 606 | 608 | 610 | 612 | 614 |
|---|---|---|---|---|---|---|---|
| | *EMPLOYEE ID* | *FIRST NAME* | *LAST NAME* | *JOB TITLE* | *DEPT.* | *SKILL* | *SKILL PROFICIENCY* |
| 620 | 1 | JOHN | SMITH | SOFTWARE ENGINEER | ENGINEERING | PYTHON | ADVANCED |
| 622 | 1 | JOHN | SMITH | SOFTWARE ENGINEER | ENGINEERING | DATA VISUALIZATION | BEGINNER |
| 624 | 2 | JANE | DOE | DATA ANALYST | ANALYTICS | DATA VISUALIZATION | INTERMEDIATE |

| *SKILL* | *REQUIRED* | *ML-ENGINEER 1* | *ML-ENGINEER 2* | *ML-ENGINEER 3* |
| --- | --- | --- | --- | --- |
| PYTORCH | YES | BEGINNER | INTER-MEDIATE | ADVANCED |
| SCIKIT-LEARN | YES | BEGINNER | INTER-MEDIATE | ADVANCED |
| TENSORFLOW | NO | - | BEGINNER | INTER-MEDIATE |

FIG. 8

DATABASE SCHEMA FOR EFFICIENT QUERIES AND DATA STORAGE

BACKGROUND

Performing a search of a database through queries enables the extraction of data from the database. A search may be facilitated via relational databases, where data is organized in one or more tables each including one or more fields. However, a relational database may be organized in an inefficient manner such that a search may produce results that are not relevant to the query. In some circumstances, a relational database may include a limited number of tables defined in a fashion such that they exhibit data redundancy, are more computationally expensive to update, have poor query performance, and/or suffer from inefficient indexing procedures. As a consequence, it may be computationally expensive to service a query via a relational database.

SUMMARY

Various implementations disclosed herein include a framework of database schemas that improves data storage and query performance by organizing data into a hierarchical set of tables. Using this more granular approach in a relational database provides significant technical improvements over previous designs. By normalizing data, redundancy is reduced, lowering storage costs and improving data consistency, as updates can be localized to a limited number of tables and entries in these tables. Query performance is enhanced since smaller, focused tables allow the database engine to scan and filter less data, while tailored indexing can further improve retrieval times. Additionally, concurrency improves as separate tables reduce lock contention during simultaneous operations, enabling better handling of transactions. Smaller, well-structured tables also fit more effectively into memory or cache, reducing reliance on slower disk input/output (I/O) and boosting processing efficiency. This modular design makes it easier to adapt and extend the schema over time, whether by adding new features or scaling for higher demand.

Together, these factors make a granular schema more performant, scalable, and maintainable in many computing systems. Notably, usage of computational resources (e.g., processing, memory, network, and power) can be reduced in comparison to previous techniques.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

One general aspect includes receiving, from a recommendation application, a definition indicative of a plurality of role values; receiving data indicative of a selection of a particular role value of the plurality of role values; and populating a database schema with the particular role value, where the database schema is arranged to represent the role values as multiple role groups per job family, multiple role levels per each of the role groups, and multiple capabilities per each of the role groups or the role levels. Other embodiments of this aspect include corresponding computer systems, apparatus, and computer programs recorded on one or more computer storage devices, each configured to perform the actions of the methods.

Another general aspect includes: identifying an entry in a database table representing an individual; determining, based on one or more capabilities database tables, a set of current capabilities of the individual; determining, based on one or more target capability database tables, a set of target capabilities of a target role; identifying, based on the set of current capabilities and the set of target capabilities, a capability gap of the individual; based on the capability gap, identifying steps that the individual can take to satisfy the target capabilities; and generating a graphical user interface component identifying the capability gaps or the steps. Other embodiments of this aspect include corresponding computer systems, apparatus, and computer programs recorded on one or more computer storage devices, each configured to perform the actions of the methods.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a database table, in accordance with example embodiments.

FIG. 8 depicts a skills matrix, in accordance with example embodiments.

DETAILED DESCRIPTION

Figure 1:
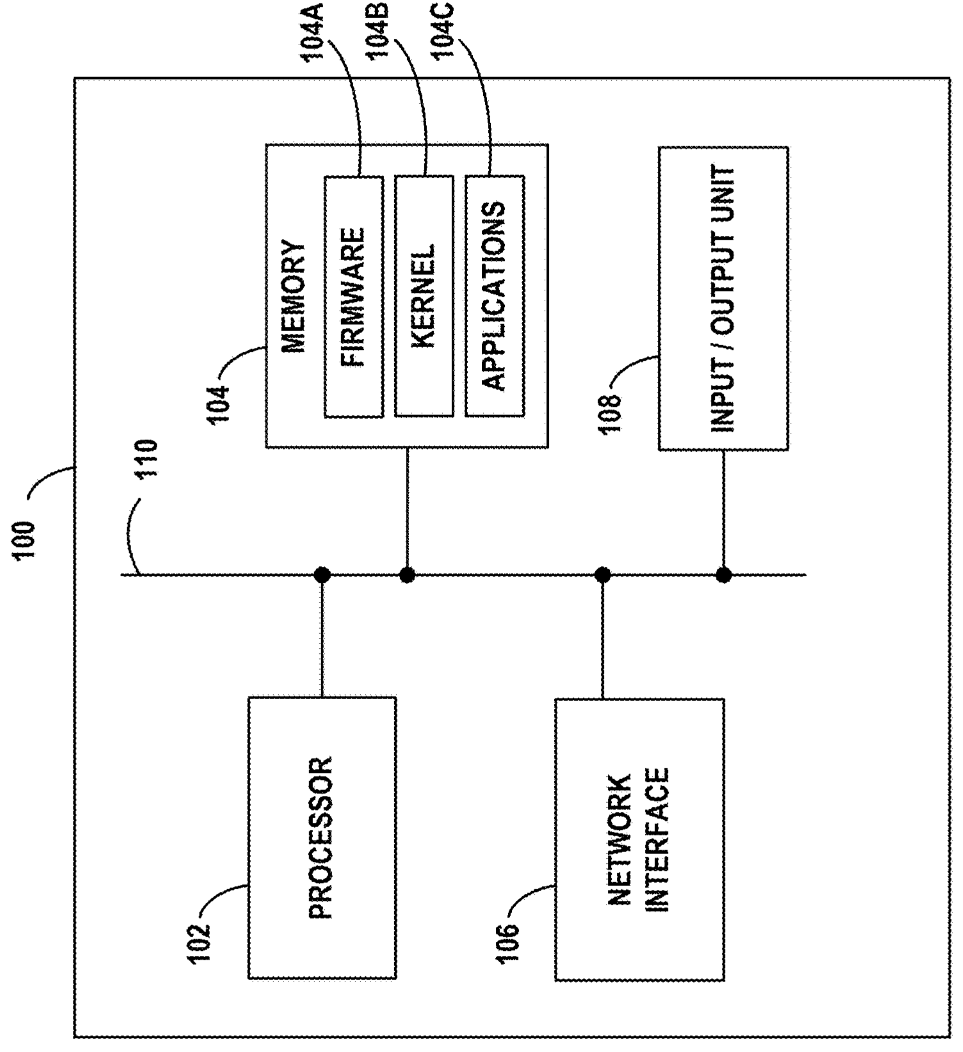
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of software features into "client" and "server" components may occur in a number of ways.

To that point, the figures and descriptions herein that relate to data models, entity relationship diagrams, and database table structures and relationships, are provided for illustrative purposes to facilitate an understanding of the disclosed embodiments. These examples are not intended to be limiting and should not be construed as such. Various modifications, changes, and variations can be made in the structure, layout, and arrangement of the databases, tables, and relationships described, all without departing from these embodiments.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being solved is a loss of computational capacity (e.g., processing, memory, network, and/or power capacity) due to inefficient searches within databases. For example, information provided in a spreadsheet or similar type of file may readily lend itself to being stored in a single database table with columns and rows that correspond to those of the spreadsheet. A search performed over such a table may be slowed by excessive I/O operations due to the redundant information stored in the table. In practice, this loss in computational capacity is problematic because reduced computational capacity hinders or prevents performance of such searches as well as other computational tasks.

The embodiments herein overcome these limitations by providing a granular database table structure that reduces or minimizes redundancies. Using this table structure, searching and/or accessing information in a database can be accomplished in a less computationally demanding and more robust fashion. This results in several advantages. First, the table structure is expected to facilitate faster searches than monolithically-designed tables. This is because the overall size of the database can be reduced by placing one copy of the otherwise redundant information in a table and having related entries in other tables refer to this copy rather than storing copies of their own. Second, concurrency improves as separate tables reduce lock contention during simultaneous operations, enabling rapid handling of transactions. Third, smaller, well-structured tables fit more effectively into memory or cache, reducing reliance on slower disk I/O, thus boosting processing efficiency.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist, including but not limited to metadata-based encodings of web components, and various uses of JAVASCRIPT® Object Notation (JSON) and/or eXtensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), a digital signal processor (DSP), a network processor, an encryption processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

GPUs, in particular, have grown in importance. They include specialized circuitry designed to perform rapid mathematical calculations for rendering graphics, processing large datasets, and supporting machine learning. A GPU typically consists of hundreds or thousands of small cores that operate simultaneously, facilitating the decomposition of tasks into smaller, more manageable pieces that are processed in parallel. This parallelism allows GPUs to be significantly faster than traditional CPUs for certain types of calculations.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Herein, any non-volatile memory may be referred to as persistent storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Synchronous Digital Hierarchy (SDH), Data Over Cable Service Interface Specification (DOCSIS), or other technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
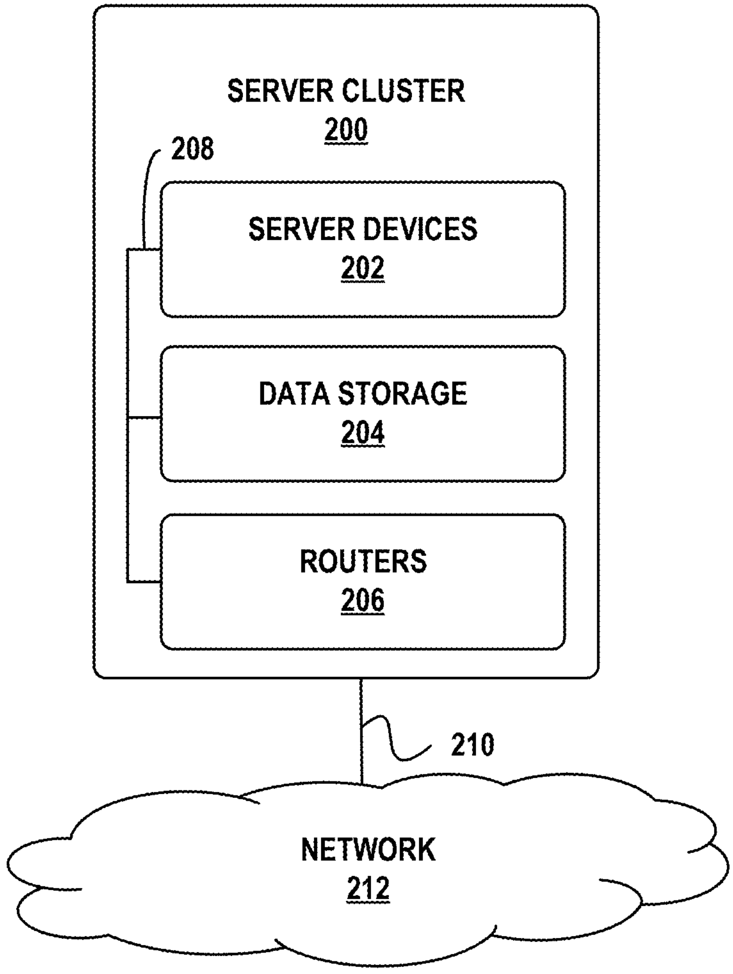
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
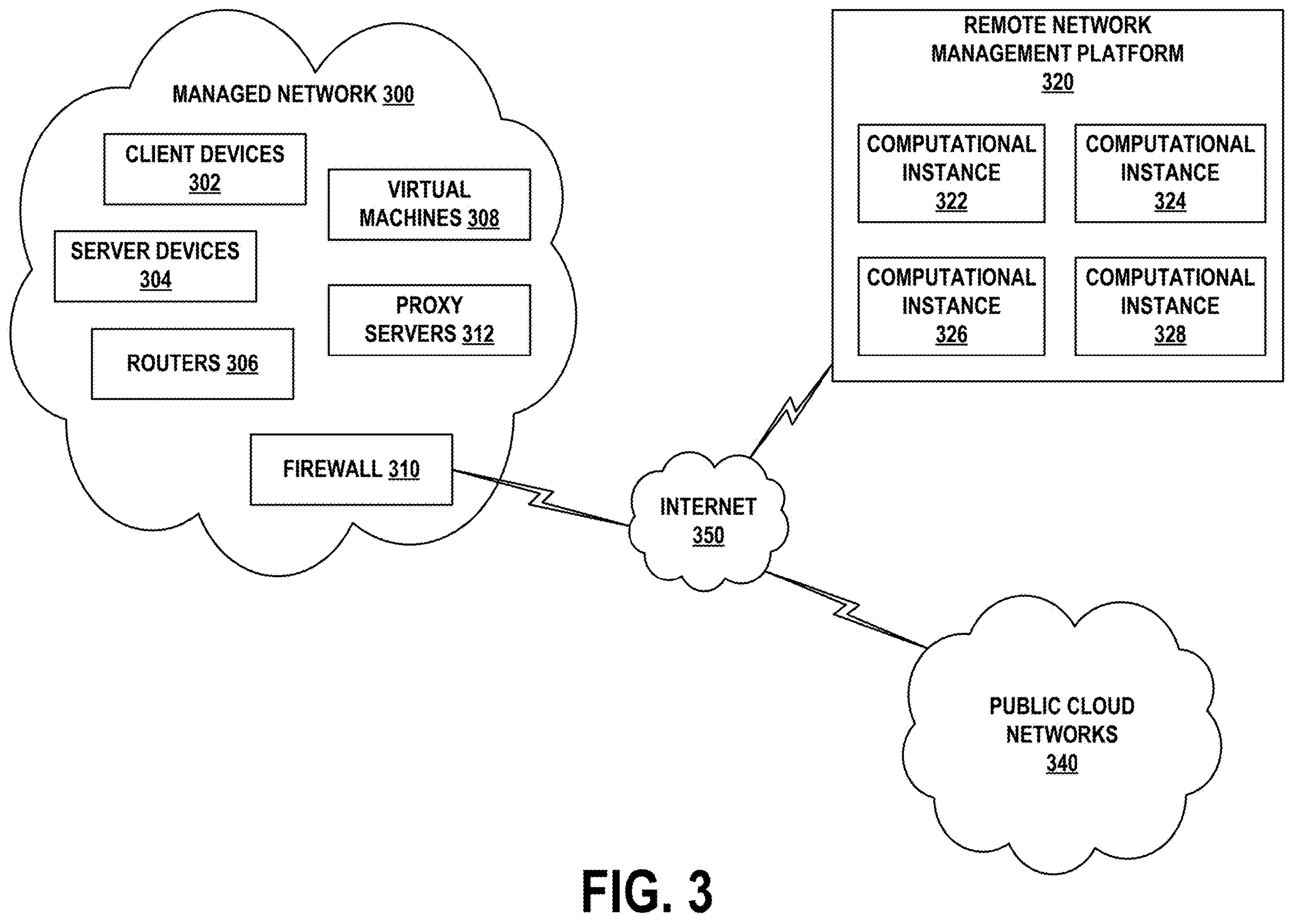
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
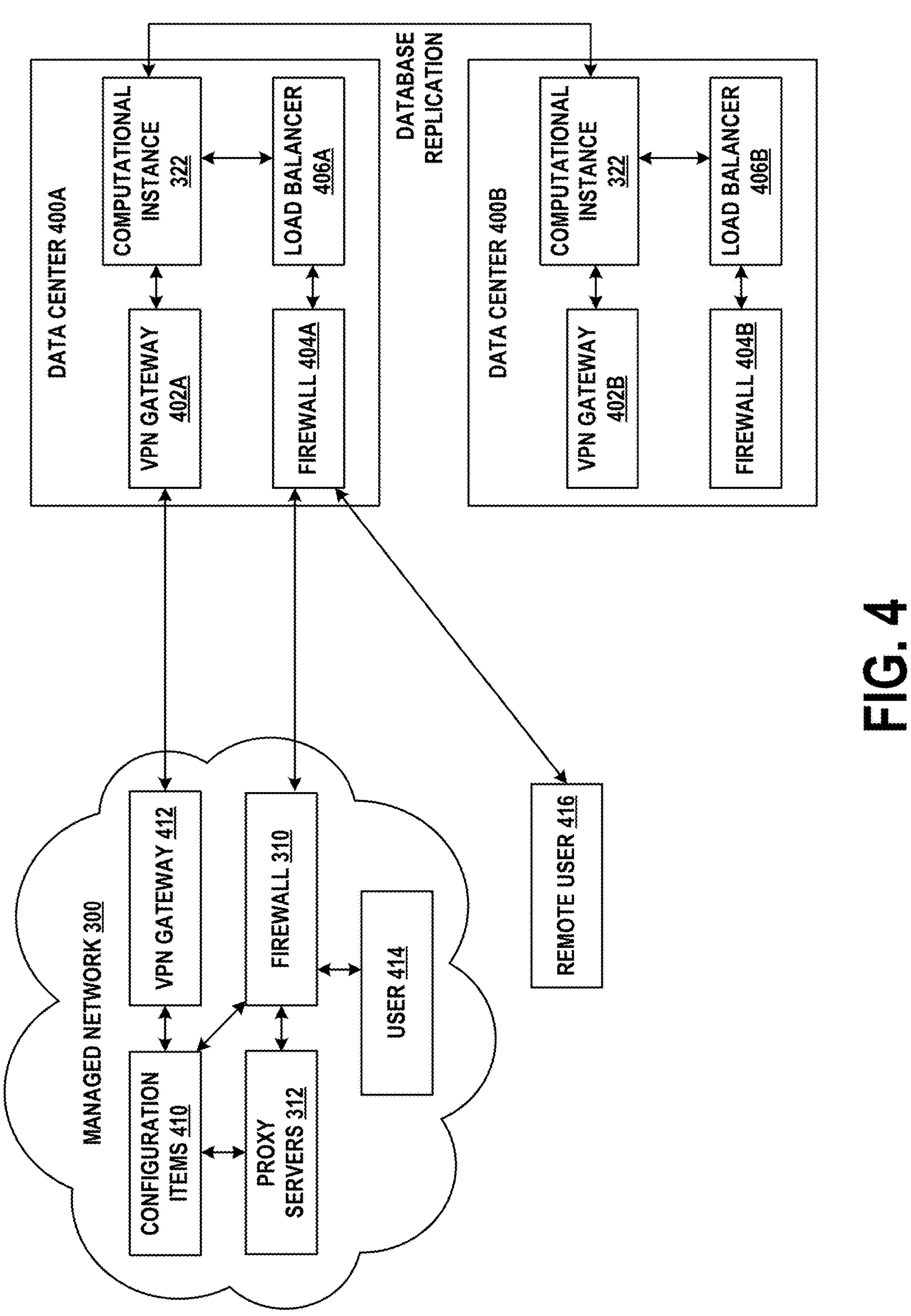
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
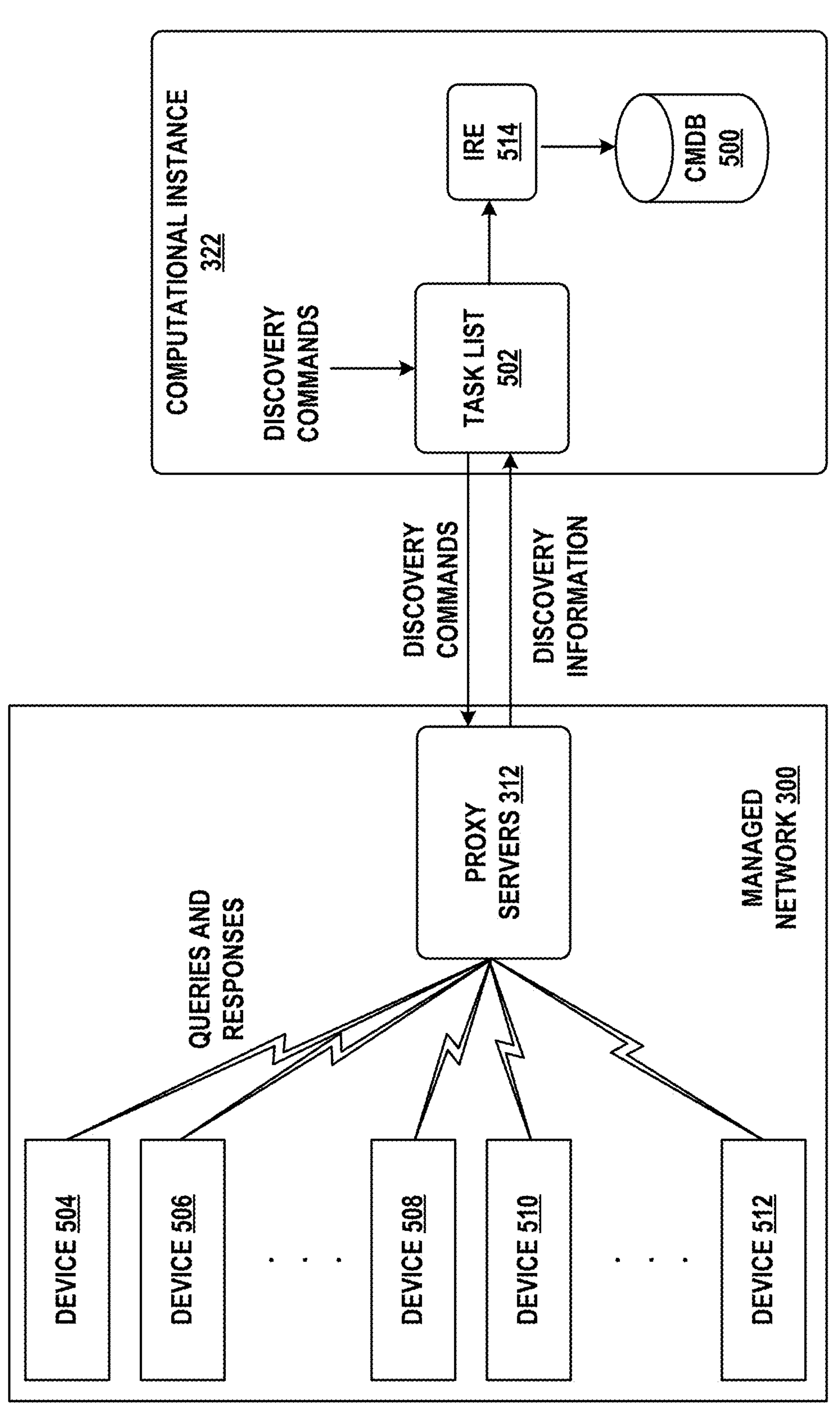
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Relational Databases

Data may be stored in various parts of remote network management platform 320. Such data can be structured in databases to facilitate access to and understanding of the data, as well as to simplify the processing and storage of the data (thereby requiring fewer computational resources).

Relational databases are designed to organize, store, and retrieve structured data. They are based on the relational model, which represents data as a collection of tables consisting of rows and columns. Each table represents an entity, with rows corresponding to individual records (also referred to herein as "entries") and columns defining attributes (also referred to herein as "fields"). Relational databases can employ a structured query language (SQL) for data manipulation and retrieval, enabling precise and scalable operations. Some features include data normalization (e.g., organizing data into a structured and efficient format by dividing it into multiple related tables and defining relationships between them), which minimizes redundancy and maintains consistency, and the use of primary and foreign keys to establish relationships between tables. This relational model supports complex queries, transactional consistency, and concurrent access, making relational databases highly suitable for applications requiring reliability, scalability, and well-defined data structures. Commonly used systems include MySQL and PostgreSQL.

A database schema defines the structure and organization of data within a database. It specifies how the data is stored, including the tables, fields within each table, and relationships between tables. The schema outlines the types of data (such as integers, text strings, dates, or references) that are to be stored in the fields. Thus, a schema acts as a blueprint for the database, defining not just the format of data, but also how it can be accessed, manipulated, and is related to other data.

In order to appreciate how schema design can impact database performance, an understanding of indexing and keys can be helpful. Indexing is a technique that enhances the speed of data retrieval by creating auxiliary data structures, such as B-trees or hash tables, which allow the database to quickly locate rows matching a query. Instead of performing a full table scan, the database uses indexes to access specific rows directly, reducing query execution time, especially for large tables. Indexes can be applied to one or more columns and may be unique per table or per database, such that there are no duplicate values in the indexed column(s). Keys, on the other hand, are constraints that define the relationships and uniqueness of data within the database. A primary key uniquely identifies each record in a table, such that no two rows have the same value for the primary key column(s). Foreign keys provide referential integrity by linking a column in one table to a primary key in another, such that there are consistent and valid relationships between tables. Together, indexing and keys contribute to the efficiency, accuracy, and structural integrity of relational databases.

Traditionally, data was maintained in a small number of tables (such as just one table in many cases). Doing so was preferable in situations where this the data is being imported from another monolithic source, such as a spreadsheet. Also, using of a small number of tables simplifies the initial design of the schema.

However, this naïve approach has a number of technical drawbacks. One such drawback is data redundancy, as repeated information inflates storage requirements and increases the risk of inconsistencies during updates. This lack of normalization also means that updates, deletions, and insertions are more computationally expensive, as redundant data may require changes in multiple rows. Query performance suffers due to the larger size of the table, as filtering and scanning through irrelevant data adds overhead, even for simple queries. Indexing becomes less efficient, as a single table requires handling complex, multi-purpose indexes, which are harder to optimize. Additionally, concurrency can become a bottleneck, as multiple users accessing and modifying a single large table may experience lock contention (e.g., when multiple transactions or operations compete for the same database resource, such as a row, table, or index, which has been locked to provide data consistency and integrity), slowing down operations. Finally, maintainability is compromised, as altering the schema or resolving issues in a denormalized structure is more error-prone and labor-intensive.

In contrast, a more granular approach with multiple tables in a relational database provides significant technical improvements over less sophisticated designs. By normalizing data, redundancy is reduced, lowering storage costs and improving data consistency, as updates typically occur in only one place. Query performance is enhanced since smaller, focused tables allow the database to scan and filter less data, while tailored indexing further optimizes retrieval times. Additionally, concurrency improves as separate tables reduce lock contention during simultaneous operations, enabling better handling of transactions. Smaller, well-structured tables also fit more effectively into memory or cache, reducing reliance on slower disk I/O and boosting processing efficiency. This modular design makes it easier to adapt and extend the schema over time, whether by adding new features or scaling for higher demand. Furthermore, foreign keys and enforced relationships bolster data integrity, preventing anomalies and maintaining reliable connections between tables.

Nonetheless, despite database normalization having many technical advantages, applying normalization has to occur on a case-by-case (application-by-application) basis. The data for each application is assessed independently and a normalized multi-table schema can be developed based on the data's unique characteristics and relationship. Selecting an efficient schema can lead to the technical improvements above, while selecting an inefficient schema will not provide these benefits.

VIII. Example Database Schema With Improved Efficiency

The embodiments herein provide a database schema, including an arrangement of tables and relationships therebetween that improve database performance for a class of applications. For purposes of example, an application that tracks and manages skills of individuals in various jobs or roles within an organization is used (mainly because it lends itself well to being decomposed into a multiple tables). But other applications can benefit from these embodiments. Note that the term "skills" and the term "capabilities" may be used synonymously in certain contexts herein.

FIG. 6 depicts an example of how information on these individuals can be stored inefficiently (here, in a single database table). Particularly, table 600 has columns for storing employee identifiers (column 602), first names (column 604), last names (column 606), job titles (column 608), department (column 610), skills (column 612), and skill proficiencies (column 614). Each row of table 600 below the column headers is an entry relating to an employee.

For example, row 620 is for an employee named John Smith who is a software engineer in the engineering department and has an employee ID of 1. For the skill of Python, this employee has a skill proficiency of advanced. Row 622 is also for John Smith, and values for the five left-most columns are the same as in row 622. However, the values of the two right-column columns indicate that John Smith has a beginner skill proficiency for the skill of data visualization. Row 624 is for an employee named Jane Doe who is a data analyst in the analytics department and has an employee ID of 2. For the skill of data visualization, this employee has a skill proficiency of intermediate.

As noted, table 600 is for purposes of example. In most practical scenarios, a table storing similar data to table 600 may have more columns and many more rows. Nonetheless, the example depicted in FIG. 6 demonstrates some of the inefficiencies of such an approach; namely, there is a significant portion of information that is duplicated between rows 620 and 622. As the size of table 600 grows, such redundancies may cause table 600 to take up several times as much space as if those redundancies were eliminated. Further, these redundancies result in a table size that makes it more I/O intensive and therefore slower to search. Moreover, maintaining table 600 is onerous as any change to the schema may require the values in some or all rows to be updated (e.g., if a new column is added, such as for phone numbers).

Moreover, the structure of table 600 does not reflect the needs of modern skill management applications. Today, each job title may be associated with a number of skills that are minimally expected for an individual with that job title to have or additional skills that are desirable. Table 600 does not provide for representing job-specific skills or their expected levels of proficiency, instead only the skills and proficiencies therein of individuals. This prevents table 600 from being used as a basis for making recommendations of skills training for these individuals or what levels of proficiency in what which skills might be required for a promotion. Additionally, table 600 does not differentiate between different subcategories of job title. For example, the software engineer job title might be further broken down into front-end engineer, back-end engineer, and machine learning engineer.

Given the drawbacks of the database schema of FIG. 6 and similar schemas, it is desirable to provide an improved schema that not only supports lower memory requirements and faster searching (e.g., by eliminating redundancies), but also better facilitates the needs of modern skill management applications.

Figure 7A:
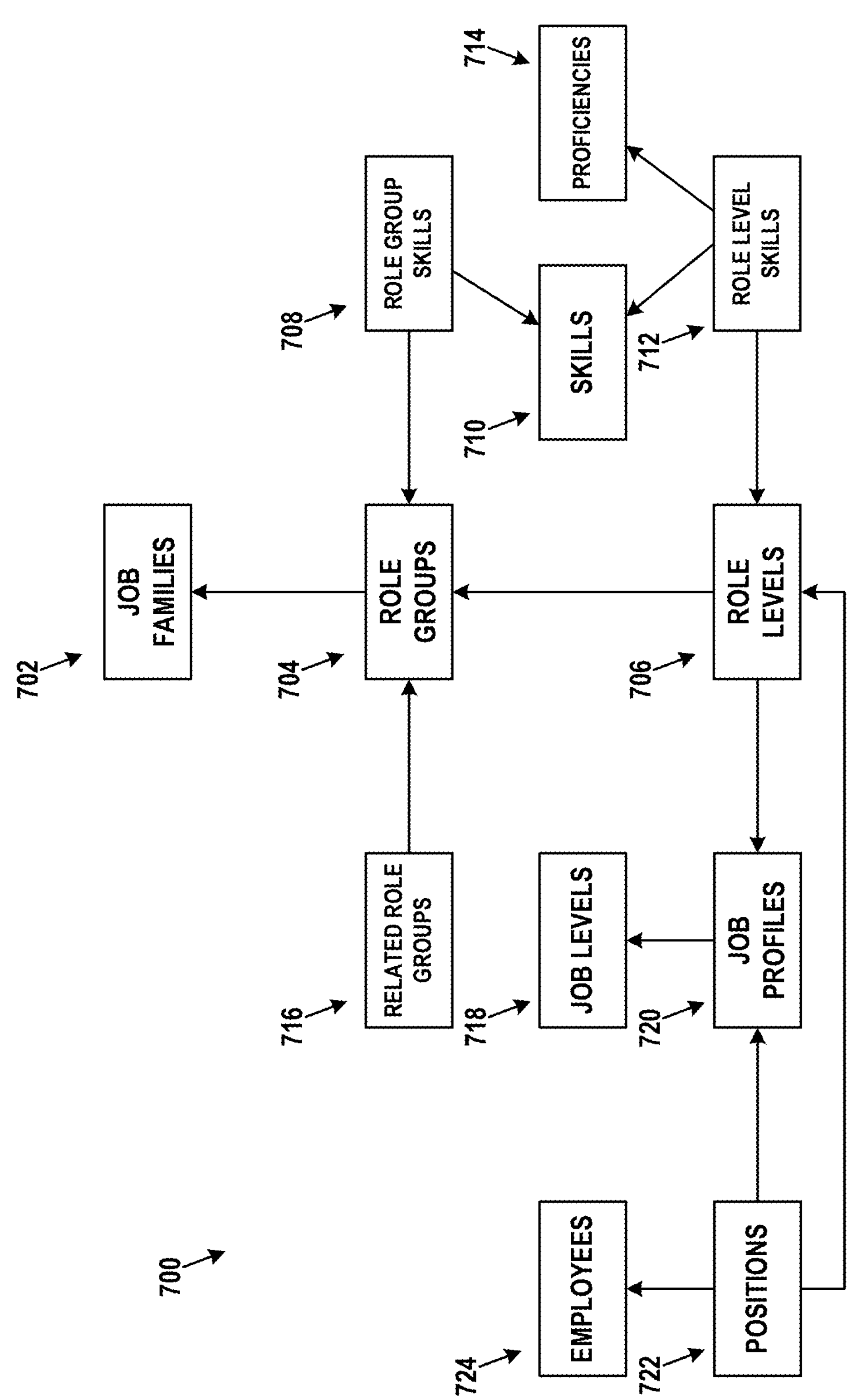
FIG. 7A depicts a schema of database tables and relationships therebetween, in accordance with example embodiments.

To this end, an example schema 700 is shown in FIG. 7A. Schema 700 contains tables that can be used to efficiently distribute the data in table 600, but also introduces tables that provide new and improved functionality to the application itself. In other words, schema 700 provides not only a technical improvement but further enables application-level features not previously available. Each table of schema 700 will be described briefly with more detail regarding each specified in the subsequent figures.

FIGS. 7A-7D and other figures, as well as their accompanying descriptions, may present database schema, tables, and their relationships in a simplified manner for illustrative purposes. Such depictions are not necessarily in the format of a formal entity-relationship diagram (ERD) and do not impose any specific implementation constraints. The depicted relationships between database elements, such as tables or entities, are merely illustrative and could represent various types of relationships, including but not limited to one-to-one, one-to-many, or many-to-many relationships. The actual implementation of such relationships may vary depending on system requirements, use cases, and design choices, and should not be construed as limiting the scope of the invention.

In order to appreciate schema 700, it is helpful to first understand how the application can be designed to meet modern requirements. In the past, one's role at an organization was typically based on job title (e.g., software engineer, data analyst), department (e.g., engineering, analytics), job code (e.g., a custom alphanumeric string) and perhaps some indication of level. The latter can be textual (e.g., junior, intermediate, senior), numeric (e.g., 1, 2, 3, where higher numbers represent more experience), and so on. However, these systems were unable to specify the skills and proficiencies thereof expected for each job title/level pair.

As an example, a senior software engineer might be expected to have an advanced skill level with Python and Java, and an intermediate skill level with cloud computing technologies. In contrast, a junior software engineer might be expected to have an intermediate skill level with Python and Java, and a beginner skill level with cloud computing. Table 600 does not support this degree of granularity at all, much less without introducing significant redundancies between entries.

But table 600 is even more deficient. Modern organizations may assign different roles to individuals based on their expertise or area of focus. For example, the job family of software engineer may be divided into more specific roles such as front-end engineer, back-end engineer, and machine learning engineer. Each of these roles may have different skill requirements. For instance, front-end engineers might be expected to be proficient in React and Angular, back-end engineers might be expected to be proficient in REST APIs, Spring, and GraphQL, and machine learning engineers might be expected to be proficient in TensorFlow, PyTorch, and Scikit-learn.

Given this, schema 700 provides different tables for job families (e.g., engineering) in job families table 702 and role groups within these job families (e.g., front-end engineer, back-end engineer, machine learning engineer for the engineer job family) in role groups table 704. Further, each role group may be associated with one or more role levels (e.g., beginner, intermediate, advanced) in role levels table 706.

Skills for each role group and role level can be defined in role group skills table 708 and role level skills table 712, respectively. Entries in role group skills table 708 may link by way of references to role groups from role groups table 704 and skills from skills table 710. Entries in role level skills table 712 may link by way of reference to role levels from role levels table 706, skills from skills table 710, and proficiencies from proficiencies table 714. In this manner, skills for each role group can be defined. Further, skills and their associated proficiencies for each role level can be defined. Related role groups table 716 may link by way of reference two different role groups from role groups table 704. This allows similar roles to be specified as such.

Entries in role levels table 706 may link to role groups from role groups table 704 and job profiles from job profiles table 720. Entries in job levels table 718 may contain a name and a description of each level. Thus, job profiles table 720 and job levels table 718 may facilitate mapping from the representations in job families table 702, role groups table 704, and role levels table 706 to an organization-specific name, description job code, and job level. The job level may also have a name and a description.

Entries in positions table 722 may link to employees from employees table 724, job profiles from job profiles table 720, and role levels from role levels table 706. Thus, each position is associated with a job profile and a role level, and may be filled by an employee. Employees table 724 contains per-employee information.

Figure 7B:
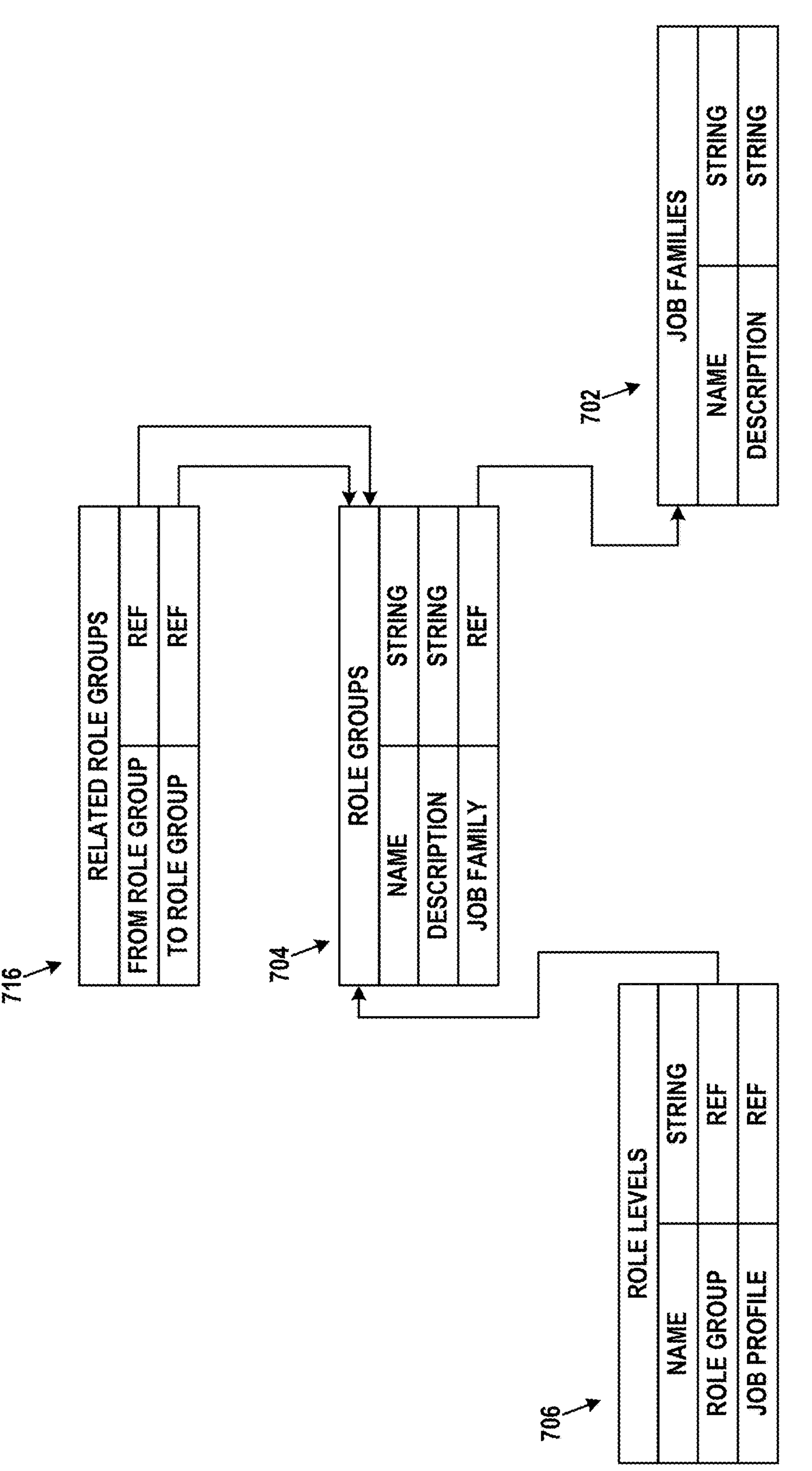
FIG. 7B depicts a portion of the schema of FIG. 7A, in accordance with example embodiments.

FIG. 7B depicts more detailed views of job families table 702, role groups table 704, role levels table 706, and related role groups table 716. In each of these views of the tables, the left side lists the columns and the right side depicts their corresponding data types. These tables have been simplified for illustrative purposes and may contain more and/or different columns.

Job families table 702 includes, for each entry, a name of a job family and its description. As one possible example, a job family might be named "software engineer", and the description might be "designing, developing, testing, and maintaining software systems and applications".

Role groups table 704 includes, for each entry, a name of a role group, its description, and a reference to the job family under which it is arranged. As one possible example, a role group might be named "back-end engineer", the description might be "building and maintaining the server-side logic, databases, APIs, and systems architecture that support the functionality, scalability, and reliability of software applications", and the reference might point to the entry for the software engineer job family in job families table 702. Notably, this arrangement efficiently supports a hierarchy in which a job family can have multiple role groups.

Role levels table 706 includes, for each entry, a name of a role level, its reference to the role group under which it is arranged, and a reference to its associated job profile. As one possible example, a role level might be named "senior", and the reference to the role group might point to the entry for the back-end engineer role group in role groups table 704. The reference to the job profile will be discussed below. Notably, this arrangement efficiently supports a hierarchy in which a role group can have multiple levels.

Related role groups table 716 includes, for each entry, two references to different role groups in role groups table 704. These references may be a from and a to reference indicating that there is an advancement path from one role group to another role group. As an example, an individual in a back-end engineer role group might be able to advance (assuming they meet various qualifications), to a machine-learning engineer, systems architect, or manager role group.

Figure 7C:
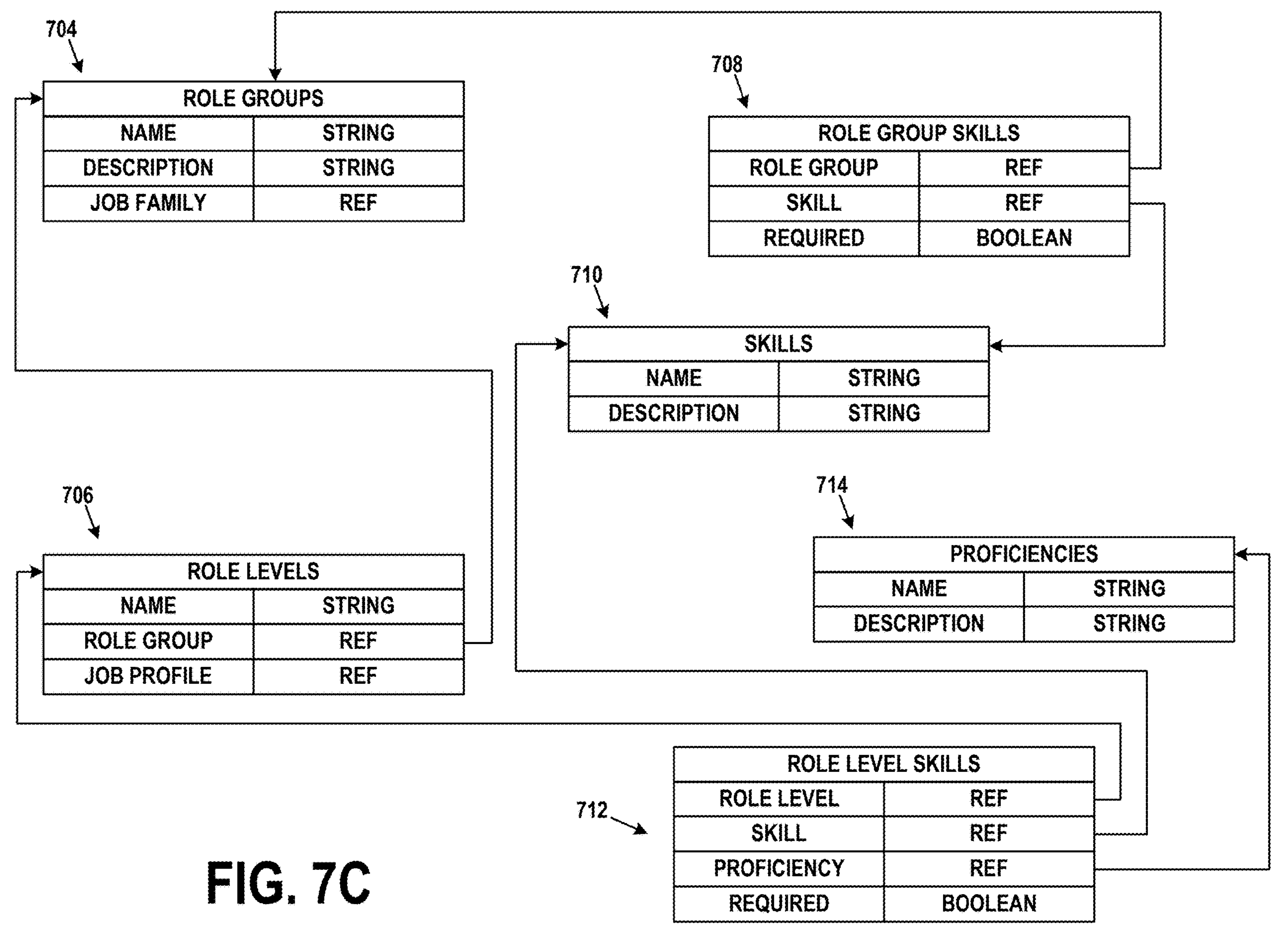
FIG. 7C depicts another portion of the schema of FIG. 7A, in accordance with example embodiments.

FIG. 7C depicts more detailed views of role group skills table 708, role skills table 710, role level skills table 712, and proficiencies table 714. Relationships between these tables and both of role groups table 704 and role levels table 706 are shown for purposes of clarity. In each of these views of the tables, the left side lists the columns and the right side depicts their corresponding data types. These tables have been simplified for illustrative purposes and may contain more and/or different columns.

Role group skills table 708 includes, for each entry, a reference to a role group in role groups table 704, a reference to a skill in skills table 710, and a Boolean required flag that indicates whether the referenced role group requires the skill. As one possible example, a role group skill might be a non-required skill of "GraphQL" for the role group of "back-end engineer". Note that a role group that is associated with multiple skills will have one entry per skill in role group skills table 708.

Skills table 710 includes, for each entry, a name of the skill and a description thereof, both in string format. As an example, the name of a skill might be "GraphQL" and the description might be to "design and implement schemas, resolvers, and queries to enable efficient, type-safe data fetching, while managing complex relationships between server-side data sources in a performative fashion".

Role level skills table 712 includes, for each entry, a reference to a role level in role levels table 706, a reference to a skill in skills table 710, a reference to a proficiency proficiencies table 714, and a Boolean required flag that indicates whether the referenced role level requires the skill at the proficiency. As one possible example, a role level skill might be a required skill of "GraphQL" at a proficiency of "intermediate" for the role level of "senior" and the role group of "back-end engineer". Note that a role level that is associated with multiple skills will have one entry per skill in role level skills table 712.

Proficiencies table 714 includes, for each entry, a name of the proficiency and a description thereof, both in string format. As an example, the name of a proficiency might be "advanced" and the description might be "a deep understanding and extensive experience with a skill, enabling the individual to handle complex tasks, solve challenging problems, and mentor others in its application".

Figure 7D:
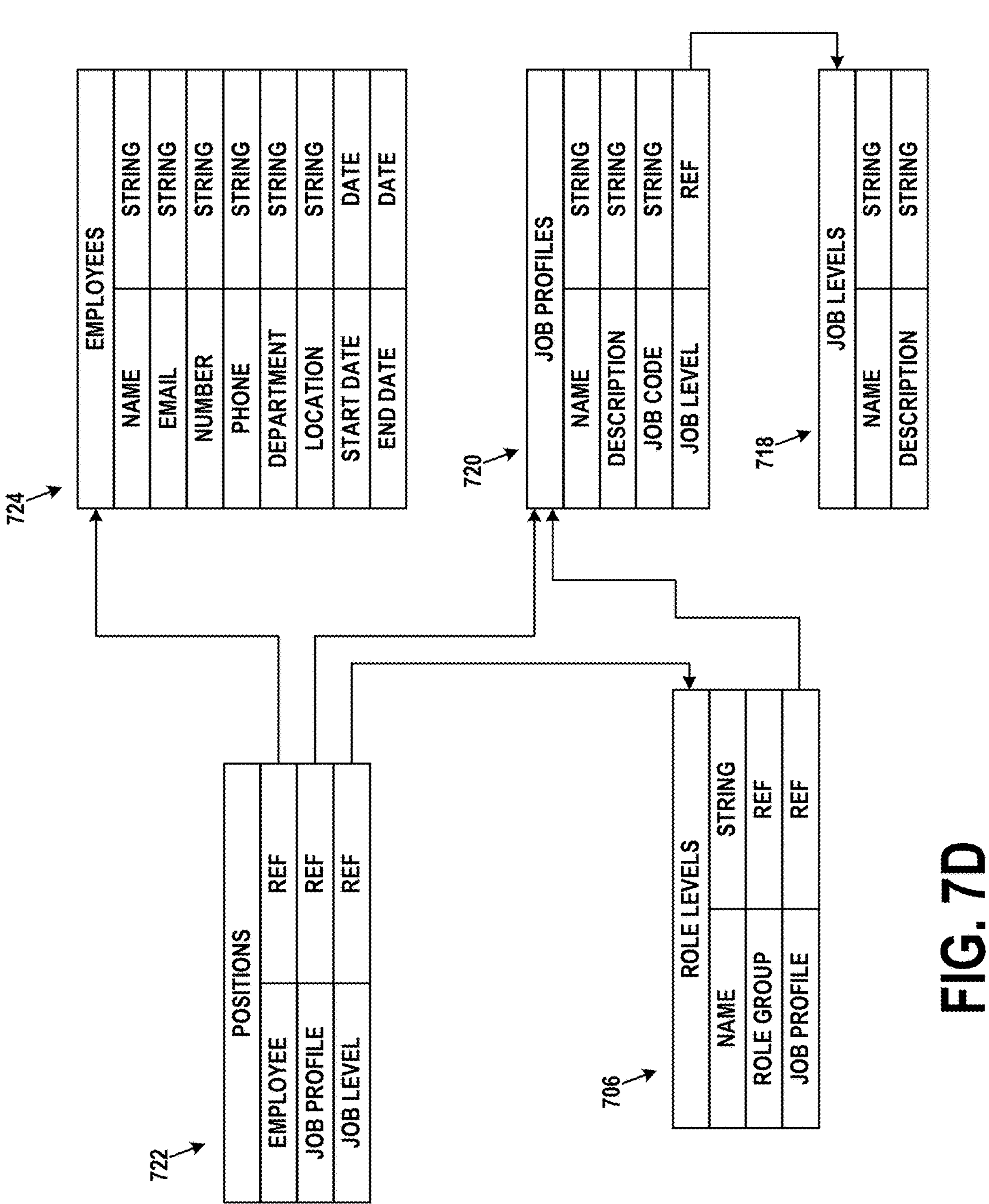
FIG. 7D depicts a further portion of the schema of FIG. 7A, in accordance with example embodiments.

FIG. 7D depicts more detailed views of job profiles table 720, job levels table 718, positions table 722, and employees table 724. Relationships between these tables and role levels table 706 are shown for purposes of clarity. In each of these views of the tables, the left side lists the columns and the right side depicts their corresponding data types. These tables have been simplified for illustrative purposes and may contain more and/or different columns.

Job profiles table 720 includes, for each entry, a name, description, and job code of a job profile, as well as a reference to a job level in job levels table 718. As one possible example, a job profile may have a name of "software engineer I", a description of "associate software engineer", and a job code of "ENG". Job levels table 718 includes, for each entry, a name, and a description of a job level. For example, the name might be "01" and the description might be "entry-level". As noted above, this allows organization-specific job codes and levels to be mapped to and associated with specific role levels.

Positions table 722 includes, for each entry, references to employees from employees table 724, job profiles from job profiles table 720, and role levels from role levels table 706. Employees table 724 includes, for each entry, a name, email address (email), employee number (number), phone number (phone), department, location, start date, and end date. While not shown herein, employees table may be coupled with an employee-skills mapping table that associates each employee with their verified skills. This facilitates comparing and matching of employee skills to the skills requirements of their job levels.

As noted above, the arrangement of schema 700 provides a technical improvement over traditional techniques, such as schema 600. As just one example, redundancy is reduced, data consistency is improved, and query performance is enhanced. Further, more accurate and useful mappings between employee skills and job skills can be made.

IX. Skills Matrix

FIG. 8 depicts skills matrix 800 as an example representation of the skill levels required or expected for different job roles. Once populated in schema 700, data therein readily lends itself to be visualized (e.g., on a GUI) or organized in accordance with skills matrix 800. For purposes of illustration, the role group is assumed to be "machine learning engineer" and this role group's role levels are assumed to be "ML-engineer 1", "ML-engineer 2", and ML-engineer 3". Nonetheless, the structure of skills matrix 800 can be used for other role groups and role levels.

The skill column in skills matrix 800 indicates that there are three skills associated with machine learning engineers, PyTorch, Scikit-learn, and TensorFlow. As indicated in the required column, PyTorch and Scikit-learn are required but TensorFlow is not. In other words, TensorFlow experience may be considered desirable for machine learning engineers but is not required.

The three rightmost column indicate the minimum level of expertise needed for each of the three role levels. As an example, the "ML-engineer 1" role level needs to have at least beginner levels of expertise in both PyTorch and Scikit-learn, but has no expertise requirement for TensorFlow. In contrast, the "ML-engineer 2" role level needs to have intermediate levels of expertise in both PyTorch and Scikit-learn, but a beginner level of expertise for TensorFlow.

Notably, FIG. 8 is just one example of a skills matrix. Different skills matrices can be defined for the "machine learning engineer" role group, as well as any other role group.

X. Recommendation Framework

While data populated in accordance with a schema such as schema 700 has inherent value, there are number of uses and applications of such a schema. This section describes just some of these uses. Others may exist.

A database employing schema 700 may be populated by gathering job data from various public or private web sites. The web sites may be, for example, those that specialize in job posting and/or job searching, or web sites of specific organizations that are seeking to fill open job vacancies. Each job posting may include one or more of a job title, a level of seniority, a set of skills required or desirable, and/or levels of expertise for at least some of these skills. Such information can be gathered in a number of ways.

Figure 9:
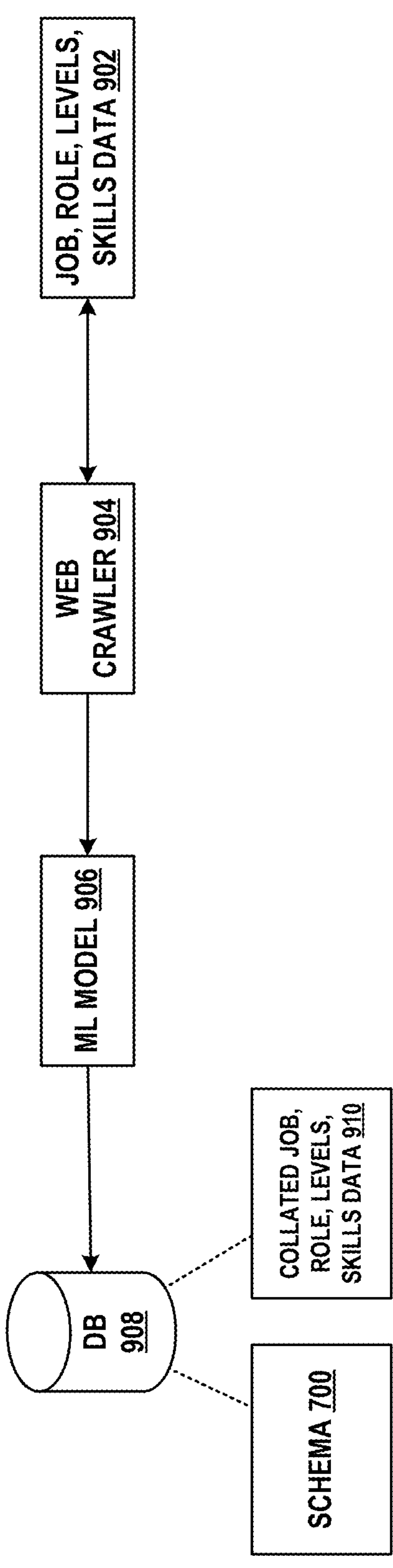
FIG. 9 depicts a data gathering system, in accordance with example embodiments.

For instance, as shown in FIG. 9, job, role, levels, and skills data 902 may be gathered by web crawler 904. Such a web crawler may be an automated software program or script designed to systematically traverse web sites. It operates by starting from a set of initial URLs, retrieving the content of web pages via HTTP or HTTPS requests, and extracting hyperlinks to discover new pages. Web crawler 904 may follow these links recursively, creating an index or repository of the crawled data (job, role, levels, and skills data 902) in order to populate database (DB) 908 in accordance with schema 700.

For example, the crawled data may be provided to machine learning (ML) model 906 for arrangement in accordance with schema 700. ML model 906 may be, for instance, a pre-trained classifier that takes text from data 902 and determines job family, role groups, skill levels, and skills in accordance with schema 700. Alternatively, ML model 906 may be a natural language processing model that employs generative artificial intelligence (e.g., a transformer-based large language model) to infer (e.g., via prompting) how data 902 can be arranged in accordance with schema 700.

For example, suppose that web crawler 904 identifies two job postings for machine learning engineers. The first states that its requirements are "Bachelor's or Master's degree in Computer Science, Data Science, or a related field; proficiency in Python, TensorFlow, PyTorch, and Scikit-learn; strong understanding of supervised and unsupervised learning techniques; experience with cloud platforms such as AWS, GCP, or Azure; excellent problem-solving skills and a data-driven mindset." The second states that its requirements are "Bachelor's degree in Mathematics, Statistics, Computer Science, or a related discipline; experience with machine learning libraries and tools such as Python, PyTorch, XGBoost, LightGBM, and pandas; knowledge of SQL and NoSQL databases for handling large datasets; solid understanding of model evaluation metrics (e.g., precision, recall, ROC-AUC); strong communication and teamwork abilities." ML model 906 may determine based on this data and its training that the required skills and skill levels are: Python (intermediate), PyTorch (advanced), supervised and unsupervised learning techniques (intermediate), and cloud platforms (intermediate). In some cases, this may involve creating and/or using mappings between external job title, job description, skill, and skill level data and an internal representation in database 908.

ML model 906 may store the arranged data in database 908. This database may include data formatted in accordance with schema 700 as well as additional collated job, role, levels, skills data 910. Data 910 may be residual data that includes a number of proposed job family, role groups, skill levels, and skills that have been inferred from data 902 by ML model 906.

Figure 10A:
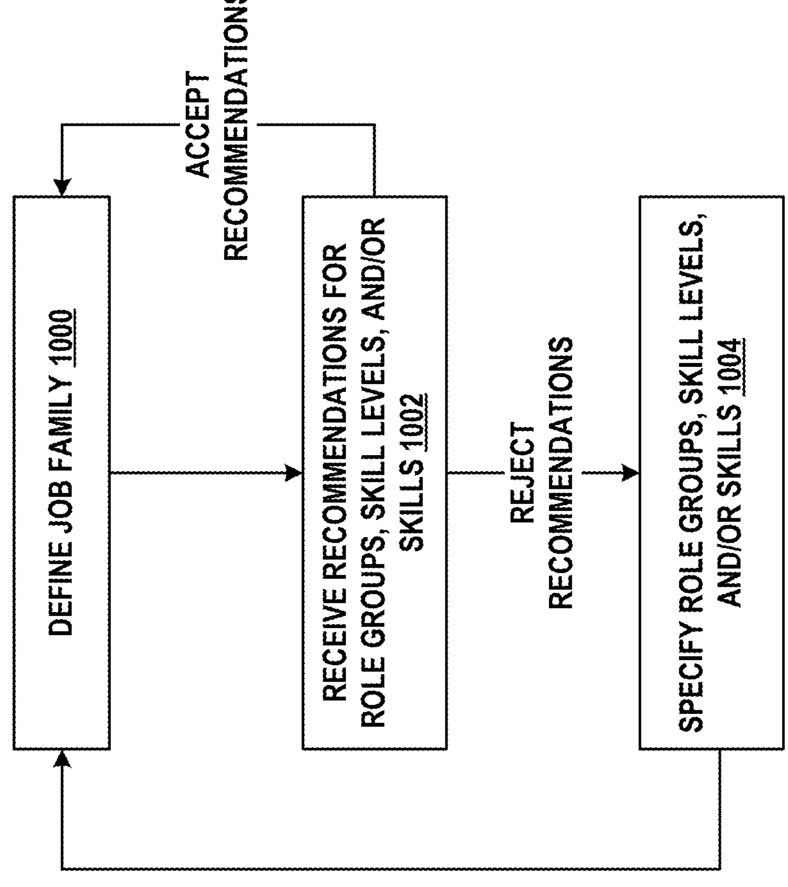
FIG. 10A depicts a recommendation workflow, in accordance with example embodiments.

In order to populate database 908 in accordance with schema 700 from data 910, a recommendation application (colloquially, a recommendation engine for example) may follow the process of FIG. 10A. However, this process is just one possible way of populating schema 700 from data 910 and others may be used.

At step 1000, the user may define a job family (e.g., "software engineer"). In response, the recommendation application may use similarity metrics to determine a job family with the same or a similar scope. The similarity metrics may benefit from vector-based semantic representations of the entered job family and data 910 being available. Examples of similarity metrics include metrics include Euclidean distance, which measures straight-line distance in multi-dimensional vector space; cosine similarity, which evaluates the angle between vectors, often used for text and high-dimensional data; and Manhattan distance, which sums absolute differences across dimensions. Other specialized metrics, like Jaccard similarity for set-based comparisons and Hamming distance for binary strings, may be used in various cases.

At step 1002, the user may receive one or more such recommendations. In response to receiving the recommendations, the user may either accept or reject them. If the user accepts the recommendations, these may be used to populate database 908 in accordance with schema 700. Then, control passes to step 1000 so that the user can define another job family.

If the user rejects the recommendations, control passes to step 1004 where the user is provided an opportunity to specify role groups, skill levels, and/or skills for inclusion in database 908 in accordance with schema 700. The user may manually enter this data, perhaps cutting and pasting some of this from the recommendations. In some cases, the user may be able to accept some but not all of the recommendations and then manually populate the rest. Regardless, control passes to step 1000 so that the user can define another job family.

Figure 10B:
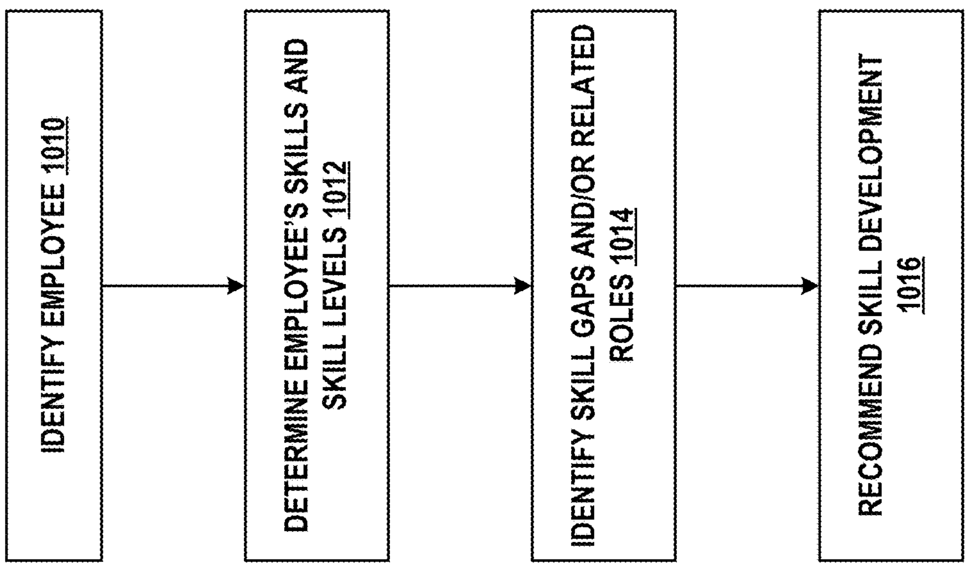
FIG. 10B depicts another recommendation workflow, in accordance with example embodiments.

FIG. 10B depicts a process illustrating a different type of recommendation. At step 1010 an employee is identified. For example, the user may search for the employee using any parameter(s) in database 908 by which the employee can be identified.

At step 1012, the employee's skills and skill levels are determined. This may involve further searching database 908 for this information based on what is known about the employee.

At step 1014, the employee's skill gaps or related roles may be identified. The skill gaps may be found by comparing representations of the employee's skills in database 908 to those required and/or desirable for that employee's job family and role group. If the employee is not at the required or desired level of expertise for any of these skills, skill development may be recommended at step 1016.

Alternatively or additionally, the skill gaps may be found by comparing representations of the employee's skills in database 908 to those required and/or desirable for that employee's related role groups. If the employee is not at the required or desired level of expertise for any of these skills, skill development may be recommended (per related role group) at step 1016.

Step 1016 may involve recommending training or experiential learning for the employee so that they can develop the skills needed to fill gaps or qualify for a different role group. As examples, training can include online coursework, in-person coursework, passing a skills test, or completing a certification. Also as example, experiential learning can involve assigning the employee a mentor who has expertise in the skills, assigning the employee tasks that require the skills, or seconding the employee in a different department where the employee can develop the skills.

Additionally, data within database 908 may be displayed in an interactive, hierarchical GUI. For example, job families, role groups, role levels, and so on may be represented as nodes in a tree-like form. Further, actuating (e.g., clicking on) any of these nodes may display further information (e.g., from database 908) for its relevant table(s) in schema 700).

XI. Example Operations

Figure 11:
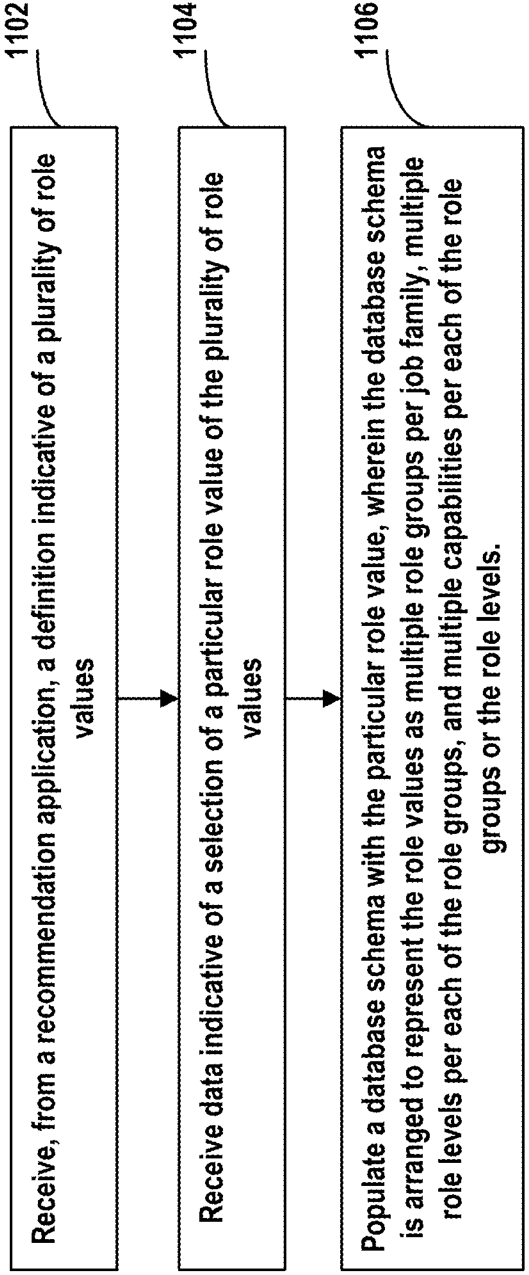
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1102 may involve receiving, from a recommendation application, a definition indicative of a plurality of role values.

Block 1104 may involve receiving data indicative of a selection of a particular role value of the plurality of role values.

Block 1106 may involve populating a database schema with the particular role value, wherein the database schema is arranged to represent the role values as multiple role groups per job family, multiple role levels per each of the role groups, and multiple capabilities per each of the role groups or the role levels. As noted above, using this table structure, searching and/or accessing information in a database can be accomplished in a less computationally demanding and more robust fashion.

In some embodiments, the plurality of role values include suggested role groups within a job family, suggested role levels within the suggested role groups, or suggested capabilities associated with the suggested role groups or the suggested role levels.

In some embodiments, populating the database schema with the particular role value comprises writing one of more of the suggested role groups, the suggested role levels, or the suggested capabilities as entries in one or more tables of the database schema.

Some embodiments may involve generating a graphical representation of the plurality of role values.

In some embodiments, the selection comprises a user input directed to a portion of the graphical representation that corresponds to the particular role value.

In some embodiments, a computing system receives the definition, generates the graphical representation, receives the data, and populates the database schema, wherein the data is received from a client device in communication with the computing system.

In some embodiments, the graphical representation comprises a graphical user interface with a plurality of user interface elements respectively associated with the plurality of role values.

In some embodiments, the multiple role groups per job family, the multiple role levels per each of the role groups, and the multiple capabilities per each of the role groups or the role levels have been defined by way of a machine learning model trained on input role values obtained from public information on one or more web sites.

Figure 12:
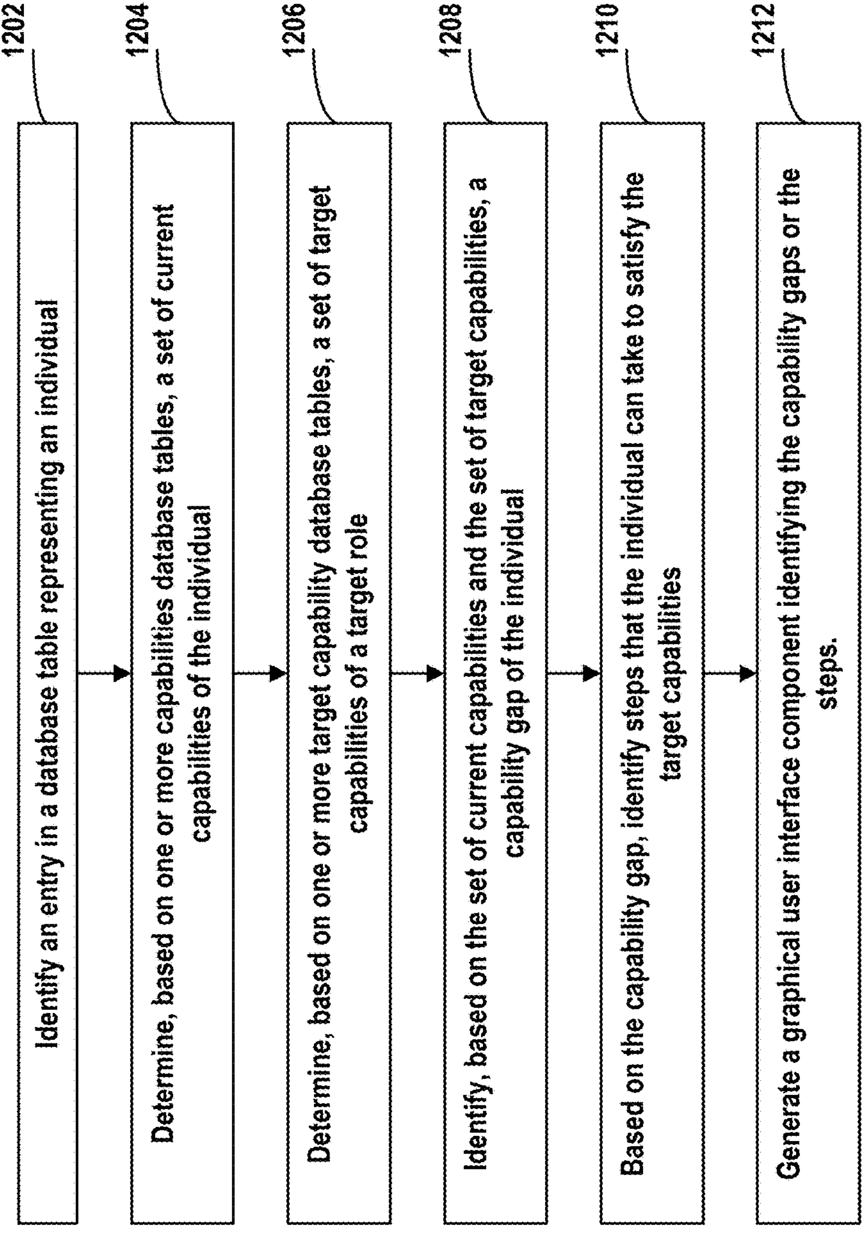
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1202 may involve identifying an entry in a database table representing an individual.

Block 1204 may involve determining, based on one or more capabilities database tables, a set of current capabilities of the individual.

Block 1206 may involve determining, based on one or more target capability database tables, a set of target capabilities of a target role. As noted above, using this table structure, searching and/or accessing information in a database can be accomplished in a less computationally demanding and more robust fashion.

Block 1208 may involve identifying, based on the set of current capabilities and the set of target capabilities, a capability gap of the individual.

Block 1210 may involve based on the capability gap, identifying steps that the individual can take to satisfy the target capabilities.

Block 1212 may involve generating a graphical user interface component identifying the capability gaps or the steps.

In some embodiments, the individual is associated with a current role stored in a role groups database table and a current level stored in a role levels database table, wherein the capability gap is identified with respect to the current role and the current level.

In some embodiments, identifying the capability gap comprises determining that one or more of the current capabilities of the individual do not satisfy one or more of the target capabilities of the target role.

In some embodiments, identifying the capability gap comprises determining that the current role is different from the target role or that the current level is different from a target level that is associated with the target capabilities.

In some embodiments, the current role is associated with the target role in a related role groups database table.

In some embodiments, the target role requires different capabilities or more advanced capabilities than the current role.

In some embodiments, the database table is part of a database schema arranged to represent the current role as one of a plurality of role groups within a job family, and the current level of the individual as one of a plurality of role levels per each of the role groups.

In some embodiments, the job family defines a general category of the current role, the role groups define more specific sub-categories of the current role, and the role levels define ranks of a role group associated with the current role.

In some embodiments, the steps include training or experiential learning for the individual that relate to the capability gap.

XII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

receiving a representation of a database schema of a database, the database schema including: a job families table, a role groups table, and a role levels table, wherein entries in the role levels table link to role groups from the role groups table, and wherein entries in the role groups table link to job families from the job families table;

gathering, by way of a web crawler, job, role, and level data from one or more websites;

providing, to a pretrained machine learning model, the job, role, and level data from the one or more websites, wherein the pretrained machine learning model has been trained to arrange data in accordance with the database schema;

populating, in response to output of the pretrained machine learning model, a first portion of the job, role, and level data in accordance with the database schema; and iteratively receiving user feedback regarding recommended role level and role group data relating to one or more proposed job families, wherein the recommended role level and role group data is from a second portion of the job, role, and level data.

2. The computer-implemented method of claim 1, further comprising:

receiving, from a recommendation application, a definition indicative of a plurality of role values, wherein the plurality of role values include role groups within a job family, role levels within the role groups, or capabilities associated with the role groups or the role levels.

3. The computer-implemented method of claim 1, wherein populating the first portion of the job, role, and level data comprises writing one or more role groups, role levels, or job families as entries in one or more tables of the database schema.

4. The computer-implemented method of claim 2, further comprising:

receiving data indicative of a selection of a particular role value of the plurality of role values; and generating a graphical representation of the plurality of role values, wherein the selection comprises a user input directed to a portion of the graphical representation that corresponds to the particular role value.

5. The computer-implemented method of claim 2, further comprising:

generating a graphical representation of the plurality of role values, wherein the graphical representation comprises a graphical user interface with a plurality of user interface elements respectively associated with the plurality of role values.

6. The computer-implemented method of claim 1, wherein the representation of the database schema further includes a skills table, a role group skills table, and a role level skills table.

7. The computer-implemented method of claim 6, wherein entries in the role group skills table link to role groups from the role groups table and skills from the skills table and entries in the role level skills table link to role levels from the role levels table and the skills from the skills table.

8. The computer-implemented method of claim 1, wherein populating the first portion of the job, role, and level data in accordance with the database schema comprises concurrently accessing the job families table, the role groups table, and the role levels table.

9. The computer-implemented method of claim 1, wherein each entry in the role groups table includes a name and a description of a role group, and a reference to a job family associated with the role group.

10. The computer-implemented method of claim 1, wherein each entry in the role levels table includes a name of a role level, a reference to a role group associated with the role level, and a reference to a job profile associated with the role level.

11. A system comprising:

one or more processors; and memory, containing program instructions that, upon execution by the one or more processors, cause the system to perform operations comprising:

receiving a representation of a database schema of a database, the database schema including: a job families table, a role groups table, and a role levels table, wherein entries in the role levels table link to role groups from the role groups table, and wherein entries in the role groups table link to job families from the job families table;

gathering, by way of a web crawler, job, role, and level data from one or more websites;

providing, to a pretrained machine learning model, the job, role, and level data from the one or more websites, wherein the pretrained machine learning model has been trained to arrange data in accordance with the database schema;

populating, in response to output of the pretrained machine learning model, a first portion of the job, role, and level data in accordance with the database schema; and iteratively receiving user feedback regarding recommended role level and role group data relating to one or more proposed job families, wherein the recommended role level and role group data is from a second portion of the job, role, and level data.

12. The system of claim 11, wherein the program instructions cause the system to perform operations further comprising:

receiving, from a recommendation application, a definition indicative of a plurality of role values, wherein the plurality of role values include suggested role groups within a job family, role levels within the role groups, or capabilities associated with the role groups or the role levels.

13. The system of claim 12, wherein the program instructions cause the system to perform operations further comprising:

receiving data indicative of a selection of a particular role value of the plurality of role values; and generating a graphical representation of the plurality of role values, wherein the selection comprises a user input directed to a portion of the graphical representation that corresponds to the particular role value.

14. The system of claim 12, wherein the program instructions cause the system to perform operations further comprising:

generating a graphical representation of the plurality of role values, wherein the graphical representation comprises a graphical user interface with a plurality of user interface elements respectively associated with the plurality of role values.

15. The system of claim 11, wherein populating the first portion of the job, role, and level data comprises writing one or more role groups, role levels, or job families as entries in one or more tables of the database schema.

16. The system of claim 11, wherein the representation of the database schema further includes a skills table, a role group skills table, and a role level skills table.

17. The system of claim 16, wherein entries in the role group skills table link to role groups from the role groups table and skills from the skills table and entries in the role level skills table link to role levels from the role levels table and the skills from the skills table.

18. The system of claim 11, wherein each entry in the role groups table includes a name and a description of a role group, and a reference to a job family associated with the role group.

19. The system of claim 11, wherein each entry in the role levels table includes a name of a role level, a reference to a role group associated with the role level, and a reference to a job profile associated with the role level.

20. A non-transitory computer-readable medium, having stored thereon program instructions that, upon execution by a computing system, cause the computing system to perform operations comprising:

receiving a representation of a database schema of a database, the database schema including: a job families table, a role groups table, and a role levels table, wherein entries in the role levels table link to role groups from the role groups table, and wherein entries in the role groups table link to job families from the job families table;

gathering, by way of a web crawler, job, role, and level data from one or more websites;

providing, to a pretrained machine learning model, the job, role, and level data from the one or more websites, wherein the pretrained machine learning model has been trained to arrange data in accordance with the database schema;

populating, in response to output of the pretrained machine learning model, a first portion of the job, role, and level data in accordance with the database schema; and iteratively receiving user feedback regarding recommended role level and role group data relating to one or more proposed job families, wherein the recommended role level and role group data is from a second portion of the job, role, and level data.

* * * * *